Dec. 16, 1930.  A. E. HONEY  1,785,197
POWER TRANSMISSION GEARING FOR USE ON RAILWAY AND OTHER VEHICLES
Filed Feb. 3, 1928  3 Sheets-Sheet 1

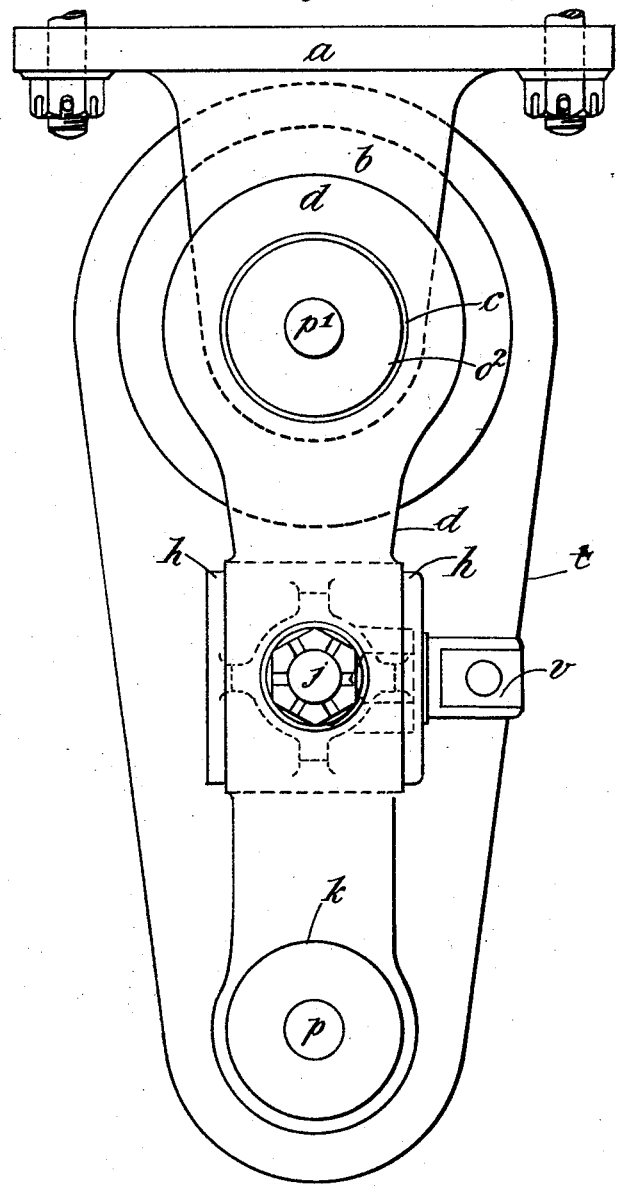

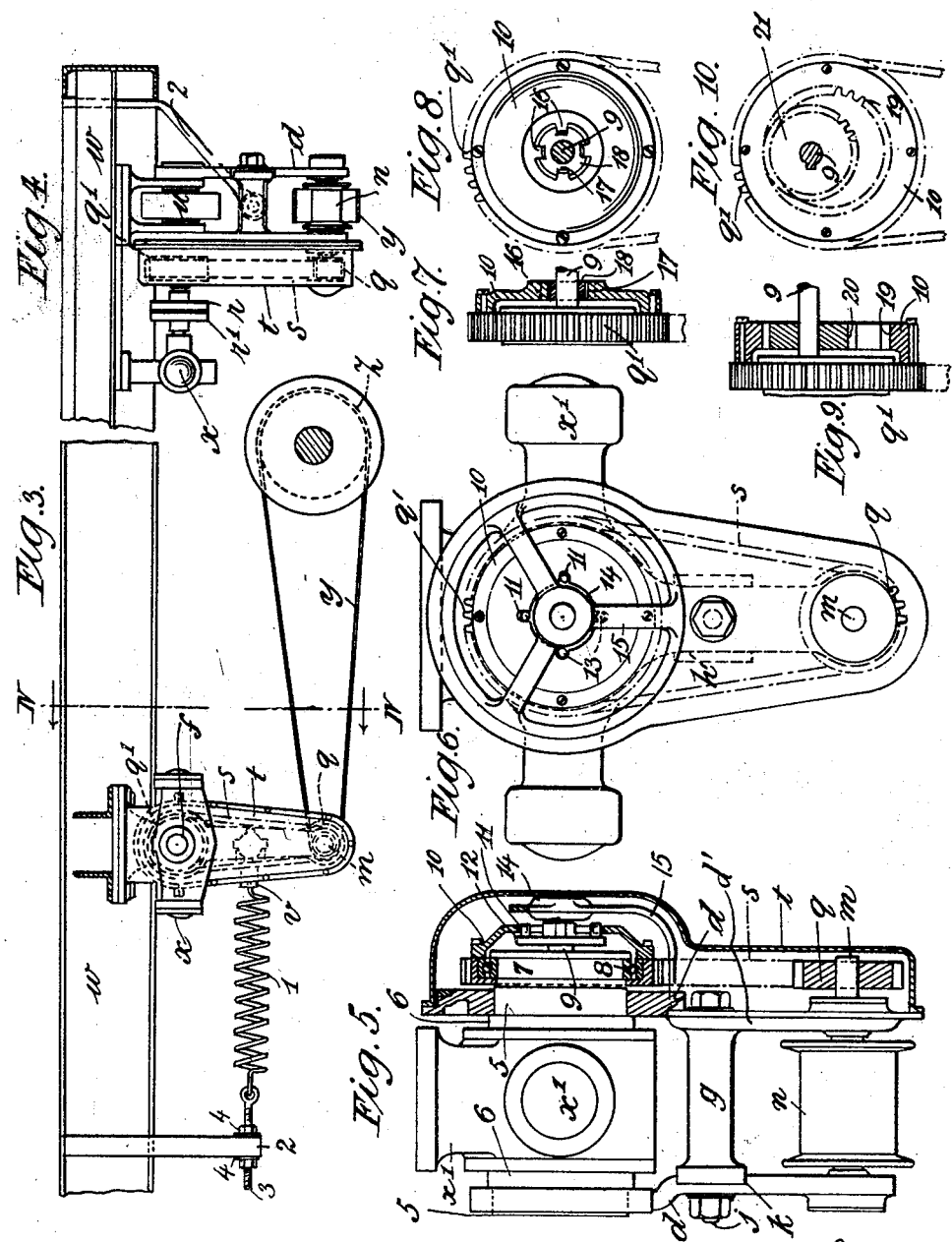

Patented Dec. 16, 1930

1,785,197

UNITED STATES PATENT OFFICE

ALFRED EDWARD HONEY, OF ILFORD, ENGLAND, ASSIGNOR TO J. STONE & COMPANY LIMITED, OF DEPTFORD, ENGLAND, A CORPORATION OF GREAT BRITAIN

POWER-TRANSMISSION GEARING FOR USE ON RAILWAY AND OTHER VEHICLES

Application filed February 3, 1928, Serial No. 251,631, and in Great Britain February 9, 1927.

This invention comprises improvements in and connected with power transmission gearing for use on railway and other vehicles. Such gearing may be applied for driving dynamos on railway carriages, although it is most advantageous when applied for the driving of a blower or compressor such as may be employed for ventilation, cooling or refrigeration purposes.

In some transmission gearings a pulley adapted for being driven from a running axle by belting is carried at the lower end of a pivotally suspended frame which is loaded or spring-actuated for the appropriate tensioning of the belt, and the drive is transmitted from the pulley spindle to a gear which is revolubly mounted coaxially with the suspension pivot. In some cases, the said frame has been pivotally suspended from pivots on the driven piece of apparatus.

One object of the present invention is to improve the efficiency and life of transmission apparatus of the kind in question by providing for the line of pull by the belt and the line of resistance to such pull by the spring or gravity loading of the frame to be approximately in the same vertical plane and between the side members of such frame which are pivotally suspended from trunnions on the body or framing of the driven piece of apparatus. In this way, the suspension frame and the piece of apparatus are not subjected to one-sided stresses and the life and efficiency of the apparatus are prolonged and preserved in spite of the exacting conditions under which such apparatus is required to be maintained in efficient working condition on railway vehicles.

A further object of the invention is so to construct the apparatus as to enable the transmission ratio between the belt pulley spindle and the said gear to be readily altered to suit given conditions.

Yet another object is to provide suitable coupling means for enabling the torque of the driven gear to be communicated to the concentric spindle of the piece of apparatus to be driven.

In order to enable the invention to be readily understood, reference is made to the accompanying drawings illustrating examples of suitable constructions in accordance with these improvements, in which drawings:—

Figure 2 is an elevation as seen from the right hand side of Figure 1.

Figure 3 is a side elevation to a smaller scale of a portion of a railway vehicle with the gearing of Figures 1 and 2 applied thereto.

Figure 4 is a sectional elevation as viewed from the right hand side of a plane of section IV—IV in Figure 3.

Figure 5 is a sectional end elevation and

Figure 6 is a side elevation of a modified construction of transmission gearing, but with the gear casing removed.

Figure 7 is a sectional end elevation and

Figure 8 is a sectional side elevation of a modified coupling means for use in the construction illustrated in Figures 5 and 6.

Figure 9 is a sectional elevation corresponding with Figure 10 and

Figure 10 is a side elevation of a hypocyclic gearing which may be used as an alternative to the coupling means illustrated in Figures 7 and 8.

Figure 1:
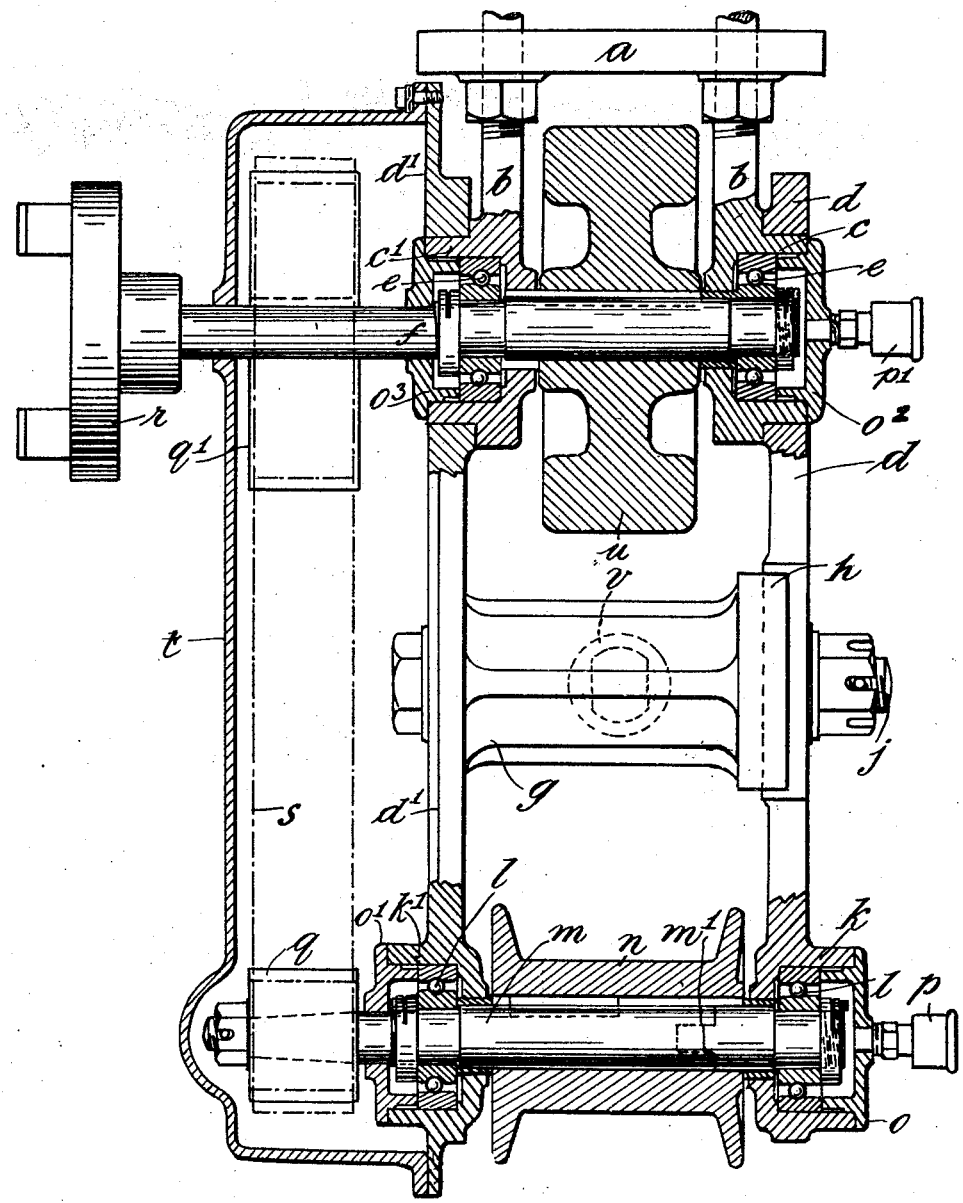
Figure 1 is a sectional elevation of one construction of gearing the section of certain of the parts being taken in a vertical plane passing through the centres of the axes of the pulley and transmission shafts.

Referring to Figures 1 and 2, $a$ is an attachment plate or base and $b$ indicates hangers depending therefrom for the suspension of the gearing from the underside of a railway vehicle underframing. The hangers $b$ are formed with hollow boss parts $c$ $c'$ serving externally as pivotal bearings for the frame members $d$ $d'$ and internally as housings for bearings $e$ for an intermediate shaft $f$. The suspension frame for the gearing comprises the members $d$ $d'$ aforesaid, which are formed with eyes for taking over the pivotal parts of the bosses $c$ $c'$ and are braced together about midway between their ends by a transverse member $g$ which may be formed integrally on the member $d'$ as shown, and may be forked at $h$ in order to embrace the other member $d$, the whole being secured tightly by a cross bolt $j$ passing through the transverse member $g$. At their lower ends, the members $d\ d'$ are formed with hollow bosses $k\ k'$ serving as bearing housings and lubricant boxes for the bearings $l$ of the spindle $m$ of the pulley $n$. The right hand end of the spindle $m$ extends into the bearing housing $k$ which is closed by a cap $o$ fitted with a lubricant cup or device $p$. The opposite end of the spindle $m$ passes through the housing $k'$ and through the annular cap $o'$, being extended beyond the latter for carrying a sprocket $q$ of suitable diameter. The spindle $m$ may be divided at $m'$, the divided portions being interlocked, as shown, to prevent relative rotation but to permit endwise separation. The right hand end of the shaft $f$ extends into the housing $c$ which is closed tightly by a cap $o^2$ fitted with a grease cup $p'$, and the opposite end passes through the housing $c'$ and through an annular cap $o^3$ this end being extended well beyond such cap so that it can be fitted with a sprocket $q'$ and also, on its extremity, with a coupling member $r$. This latter is advantageously a member of a pin coupling of the kind adapted for permitting of efficient driving even when the driving and driven shafts are not in accurate alignment. The sprockets $q\ q'$ and a chain $s$ running around them are preferably of the kind commonly adopted for what is known as the silent sprocket and chain gearing, and this gearing is enclosed by a gear casing $t$ which is bolted on to the adjacent frame member $d'$, an oil-tight aperture being formed at the appropriate place for the shaft $f$ to pass through, as will be apparent from Figure 1. On the shaft $f$, and between the members $d\ d'$ a flywheel $u$ may be fitted, particularly when the apparatus to be driven through the coupling member $r$ is one of a pulsatory character such as a piston pump.

The cross member $g$ is formed with a boss into which an eye piece $v$ is screwed but such eye may be mounted in any suitable manner.

For the purposes of this invention, the flywheel $u$, its shaft $f$ and its hangers $b$, may be said to constitute the driven piece of apparatus, the fly-wheel constituting in this sense a power receiving and imparting means. In other constructions, such as those hereinafter described, the driven piece of apparatus from which the frame is suspended may be a machine, such as a compressor or dynamo, which is capable of performing the actual useful service required on the vehicle, whereas, with the device in Figures 1 and 2, the power must be transmitted from the fly-wheel through the coupling $r$ to such useful service machine.

Referring to Figures 3 and 4, it will be seen that the apparatus of Figures 1 and 2 is adapted to be suspended from the underframe $w$ of a railway vehicle, the coupling member $r$ being coupled with another member $r'$ on the spindle of a compressor $x$ secured to the underframe. The pulley $n$ is connected by a belt $y$ with a pulley $z$ on a running axle of the vehicle whilst the eye $v$ is connected by a belt-tensioning spring 1 with a bracket 2 depending from the underframe, the tension of the spring being adjustable by means of the screw 3 and nuts 4.

It will be apparent that when the vehicle runs in either direction, the compressor $x$ or other piece of apparatus will be driven from the running axle through the belt $y$ and sprocket and chain gear $q\ s\ q'$, the spring 1 maintaining appropriate tension of the belt $y$ due to the pivotal suspension of the frame members $d\ d'$ from the pivots on the bosses $c\ c'$. There is a reduction ratio between the sprockets $q\ q'$ but any desired transmission ratio may be adopted between the spindle $m$ and intermediate shaft $f$.

The construction possesses several practical advantages. Firstly, the effect of the belt-tensioning spring 1 is applied in a vertical plane which passes through the centre line of the run of belting, so that such spring exerts no slewing influence on the pulley spindle or on the shaft $f$. Secondly, the transmission mechanism is made as a complete and self-contained unit capable of being fixed to any suitable underframe or bogie. Thirdly, it is easy to change the transmission ratio by simply removing the gear case $t$ and one or both of the sprockets $q\ q'$ and substituting a sprocket or sprockets of different diameter. Fourthly, a new pulley $n$ of the same or different diameter is very easily substituted for the existing one, this being accomplished by simply removing the cross bolt $j$ of the frame and freeing the arm or member $d$. This arm comes away with the shorter divided portion of the pulley spindle $m$ which remains in its appropriate bearing in the boss of the arm $d$ and the pulley $n$ is then free to be withdrawn from the longer portion of the spindle $m$ which remains mounted in the other arm or frame member $d'$. Fifthly, all bearings are enclosed and provided with efficient lubrication so that the spindles are capable of running for long periods with a minimum of attention and supervision.

A weight or gravity loading may be applied to the frame for tensioning the belt $y$ and the action of such weight will be effective in the same plane and with the same advantage as that of the spring 1.

According to the modification illustrated in Figures 5 and 6, the side members $d\ d'$ are pivotally suspended from two large trunnions 5 formed on the casing of the compressor $x'$ which is adapted to be fixedly suspended from the underframe between the two members $d\ d'$ and thus to take the place of the hangers $b$ in Figures 1 and 2. If desired, the compressor $x'$ may receive support from hangers which could be adapted for receiving the trunnion parts 6. The frame members d d' are braced by the cross piece g and bolt j and support in their lower ends a pulley spindle m and pulley n, all as in Figures 1 and 2. The sprocket q' which is geared by the chain s with the sprocket q on the pulley spindle m is, in this modification, a sprocket ring revolubly mounted on an extension 7 of one of the trunnions 5, a ball bearing 8 being provided to give easy running. Various means may be adopted for coupling the sprocket ring q' with the spindle 9 of the compressor x'. For example, an annulus 10 may be bolted by its outer periphery to the sprocket ring q' and its inner periphery may be formed with a number of notches 11 appropriately spaced around the circle. An extension of the compressor spindle 9 may be fitted with a disc 12 furnished with studs 13 spaced similarly to the notches 11. These notches are engaged with the studs 13 and the sprocket ring is thereby coupled with the shaft of the pump or compressor. The outer end of the extension of the compressor spindle may be supported by a bearing 14 on an arm 15 suitably attached to the frame member d'.

As an alternative and as shown in Figures 7 and 8, the annulus 10 may be formed around its inner periphery with projections or dog teeth 16 which may be engaged with notches 17 formed in the periphery of a disc 18 fixed on the spindle 9 of the compressor.

As a further alternative, and as shown in Figures 9 and 10, the inner periphery of the annulus 10 may be formed with gear teeth 19 meshing with the peripheral teeth 20 of a disc 21 fixed on the compressor spindle 9. The internal gear ring 19 may be of greater diameter than the toothed disc 21 so that there may be a desired transmission ratio between these two parts, in which case, of course, the sprocket ring q' and annulus 10 must be supported eccentrically of the spindle 9.

In the construction illustrated in Figures 5 and 6, it is advantageous to connect the delivery pipe with the pump through the centre of one of the trunnions. In order to be able readily to remove a pulley n for attention or for substitution by another of different diameter, and to avoid disturbing any of the pump connections, it may be desirable to form the removable, side frame or member d in two pieces or lengths the upper length being attached to the forked piece h of the cross piece g by means of countersunk screws, the lower length being constructed at its upper end to lap over the lower end of the upper length, the securing bolt j passing through these overlapping ends.

Thus when it is desired to replace a pulley the lower length of the frame only is removed the upper length being left in position.

I claim:—

1. Power transmission gearing for use on railway and like vehicles for transmitting power from a running axle to a piece of apparatus on such vehicle, said gearing comprising an elongated two-sided frame pivotally suspended from the said piece of apparatus, a pulley revolubly mounted in bearings in the lower part of the side members of said frame, a gear revolubly mounted coaxially with the suspension pivot and operatively connected with the spindle of the driven piece of apparatus, transmission gearing between said pulley and said gear, and a cross frame member spacing the side frame members apart.

2. Power transmission gearing for use on railway and like vehicles for transmitting power from a running axle to a piece of apparatus fixedly mounted on said vehicle, comprising trunnions on said piece of apparatus, said trunnions encircling the shaft of such apparatus, an elongated two-sided frame pivotally suspended by its side members from said trunnions, a pulley spindle revoluble in bearings in the lower ends of said side members, a belt pulley on said spindle and between said side members, gearing between said spindle and said shaft for transmitting power from the former to the latter, and a cross member disposed between said side members and adapted for the attachment of loading means which are operative for tensioning the belt on said pulley.

3. Power transmission gearing for use on railway and like vehicles for transmitting power from a running axle to a piece of apparatus mounted on said vehicle comprising trunnions on said apparatus, frame members formed with hubs for pivotally suspending them from said trunnions, a cross member spacing said frame members apart and connecting them together, bearings in the lower ends of said frame members, a spindle revoluble in said bearings and having one end extended through one of said bearings, a belt pulley fixed on said spindle between said frame members, a gear fixed on the extension of said spindle, and transmission gearing between said gear and the shaft of said apparatus, said transmission gearing including a coupling.

4. Power transmission gearing for use on railway and like vehicles for transmitting power from a running axle to a piece of apparatus mounted on said vehicle, comprising framing members pivotally suspended from trunnions situated on opposite sides of said apparatus and encircling the shaft thereof, a belt pulley revolubly mounted at the lower ends of and between said members, loading attachment means connected between said members, and power transmitting means between the pulley spindle and said shaft, said means being disposed externally of one of said members.

5. Power transmission gearing for apparatus on railway and like vehicles comprising a frame composed of side members spaced apart and pivotally suspended from the piece of apparatus to be driven, a pulley revolubly mounted between said side members at the swinging end, a spindle for said pulley, a gear on the pulley spindle beyond one of said side members, a gear revoluble concentrically around the pivot axis, a driving connection between the second gear and the shaft of the apparatus to be driven, and means operative to swing the frame in one direction.

6. Power transmission gearing for apparatus on railway and like vehicles comprising a frame composed of side members spaced apart and pivotally suspended from trunnion pivots on the piece of apparatus to be driven, a bearing concentric with said trunnions, a revoluble member supported by said bearing, a belt pulley mounted between said side members at the swinging end of said frame, gearing operatively connected between the pulley spindle and said revoluble member, and means constantly operative on a part of said frame between said side members and influencing said frame in the direction for tightening the belt of said pulley.

7. Power transmission gearing for apparatus on railway and like vehicles, comprising a pivotally suspended frame composed of a fixed side member and a detachable side member spaced apart, fixedly mounted bosses affording suspension pivots for said frame and bearing supports for a revoluble member having an axis of revolution coincident with the pivotal axis, a pulley, a two-part spindle for said pulley one part having a bearing in the fixed side member and the other part having a bearing in the detachable side member, and gearing operatively connected between the pulley spindle and said revoluble member substantially as set forth.

8. Power transmission gearing for driving apparatus on a vehicle from a running axle thereof, comprising a swinging frame pivotally suspended from said vehicle and embodying a detachable side member, a pulley revolubly mounted in the swinging end of said frame and readily interchangeable due to the detachability of said member, a revoluble member mounted coaxially with the suspension pivot, gearing operatively connected between the spindle of said pulley and said revoluble member, and a coupling member associated with said revoluble member, substantially as set forth.

9. Power transmission gearing for driving apparatus on a vehicle from a running axle thereof, comprising a swinging frame pivotally suspended from said vehicle, a pulley revolubly mounted in the swinging end of said frame, a toothed ring revolubly mounted on a bearing on the apparatus to be driven, the axis of revolution coinciding with the axis of the pivotal suspension, gearing between the spindle of said pulley and said ring, and inter-meshing means between said ring and the shaft of the apparatus.

A. E. HONEY.